US006760490B1

(12) United States Patent
Zlotnick

(10) Patent No.: US 6,760,490 B1
(45) Date of Patent: Jul. 6, 2004

(54) EFFICIENT CHECKING OF KEY-IN DATA ENTRY

(75) Inventor: Aviad Zlotnick, Mizpe Netofa (IL)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 09/672,858

(22) Filed: Sep. 28, 2000

(51) Int. Cl.⁷ .............................................. G06K 9/03
(52) U.S. Cl. ...................................... 382/311; 382/175
(58) Field of Search ............................... 382/159, 175, 382/181, 224, 225, 310, 311; 345/700; 715/507

(56) References Cited

U.S. PATENT DOCUMENTS

| | | | | |
|---|---|---|---|---|
| 3,676,849 A | * | 7/1972 | Malandro et al. ............ 340/5.8 |
| 4,763,252 A | * | 8/1988 | Rose .......................... 345/168 |
| 4,914,709 A | * | 4/1990 | Rudak ........................ 382/311 |
| 4,974,260 A | * | 11/1990 | Rudak ........................ 382/311 |
| 5,025,484 A | * | 6/1991 | Yamanari et al. ........... 382/311 |
| 5,182,656 A | | 1/1993 | Chevion et al. ............. 358/452 |
| 5,204,756 A | | 4/1993 | Chevion et al. ............. 382/259 |
| 5,233,672 A | * | 8/1993 | Yamanari et al. ........... 382/310 |
| 5,257,328 A | * | 10/1993 | Shimizu ..................... 382/311 |
| 5,265,242 A | * | 11/1993 | Fujisawa et al. ............... 707/3 |
| 5,271,067 A | * | 12/1993 | Abe et al. ................... 382/311 |
| 5,371,807 A | | 12/1994 | Registered et al. ......... 382/159 |
| 5,394,484 A | * | 2/1995 | Casey et al. ................ 382/159 |
| 5,455,875 A | | 10/1995 | Chevion et al. ............ 382/311 |
| 5,628,003 A | * | 5/1997 | Fujisawa et al. ......... 707/104.1 |
| 5,793,887 A | | 8/1998 | Zlotnick ..................... 382/209 |
| 5,857,034 A | * | 1/1999 | Tsuchiya et al. ............ 382/175 |
| 6,466,694 B2 | * | 10/2002 | Kamada et al. ............. 382/181 |

OTHER PUBLICATIONS

Lopresti, et al. "Certifiable Optical Character Recognition", IEEE, pp. 432–435, 1993.*

* cited by examiner

Primary Examiner—Daniel Mariam
(74) Attorney, Agent, or Firm—Darby & Darby

(57) ABSTRACT

A method for data key-in includes receiving images of documents containing characters and receiving character codes entered by one or more key-in operators, the codes corresponding respectively to the characters in the documents. For at least some of the character codes, respective areas of the images that contain the corresponding characters are identified, such that each of the areas contains one of the characters. A group of the areas of the images is displayed together responsive to the corresponding character codes, so as to facilitate verification of the codes by a verifying operator.

20 Claims, 2 Drawing Sheets

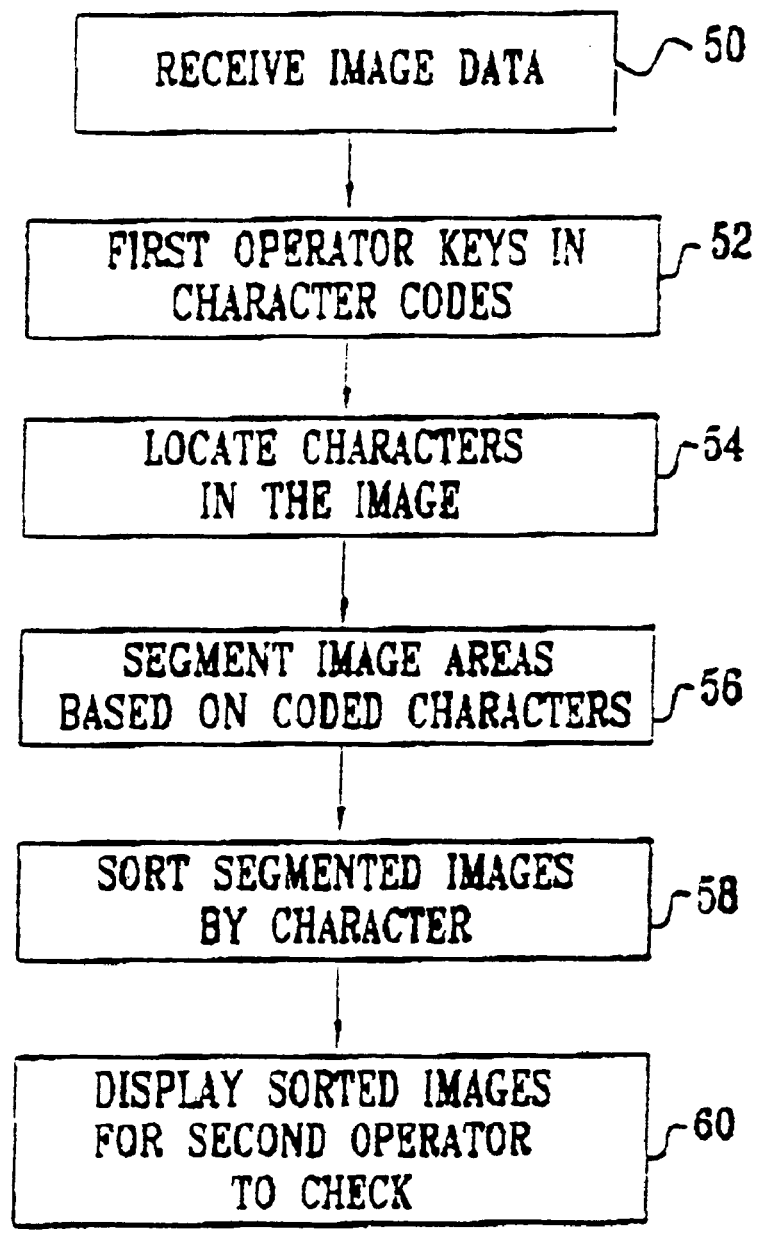

EFFICIENT CHECKING OF KEY-IN DATA ENTRY

FIELD OF THE INVENTION

The present invention relates generally to entry of data from form documents into a computer, and specifically to methods and systems for improving the accuracy and efficiency of manual key-in of such data.

BACKGROUND OF THE INVENTION

Despite progress in automation of data gathering functions, much large-scale data collection, such as census taking, is still carried out by manually filling in forms. The data are typically written by hand into designated fields on a preprinted form. Although optical character recognition (OCR) can generally be used to read at least a portion of the forms automatically by computer, there usually remain many fields that cannot be deciphered by OCR, at least not with a desired level of confidence. These fields must then be processed by a human operator, who manually keys the field contents into a computer. This manual key-in is typically the most costly part of large-scale data gathering. Manual key-in is also used in applications, such as check processing, for which OCR is not sufficiently accurate or is otherwise unsuitable.

In large-scale manual key-in, forms to be processed are generally scanned into a computer, and an image of the entire document or of each field that is to be keyed is displayed on the operator's computer screen. Manual key-in is typically about 95% accurate, which is far too low for most applications. The usual solution to this problem is to have all of the data keyed-in twice, by two different operators, which doubles the cost of processing. Visual checking of the keyed-in data against the original field images is no less time-consuming.

U.S. Pat. No. 5,455,875, whose disclosure is incorporated herein by reference, describes a system and method for quality control and correction of computer-generated OCR data by a human operator. The principles of this patent are embodied in the Intelligent Forms Processing (IFP)system produced by IBM Corporation, of Armonk, N.Y. The system can be configured to display to a human operator a full screen of images of individual characters from scanned documents, which were classified by OCR as being the same character. This type of image is referred to as a "carpet." Errors in the OCR are manifested as character images that do not fit the displayed classification and stand out clearly against the correct images in the carpet. For example, if the OCR erroneously classifies a "P" as an "A," the operator will see an image of a P in a screen full of A's. This type of discrepancy is very easy for the human operator to spot and mark on the screen. The image of the field that was read erroneously by the OCR is then displayed so that the operator (or another operator) can type in the correct character.

SUMMARY OF THE INVENTION

Preferred embodiments of the present invention provide improved methods and systems for visual checking and correction of character data that have been keyed in by a human operator. A computer key-in system displays images of filled-in form documents, or of fields in such documents, for viewing by an operator who keys in corresponding character codes, as is known in the art. The system then uses the character codes to segment the images, preferably so that each segment contains a single character and has an associated character code that has been keyed in by the operator. The system groups the image segments according to the associated character codes and displays the grouped segments together in a "carpet" of segments for viewing by a verifying operator. If the key-in operator were totally accurate, all of the segments would contain the same character (albeit in different forms). Practically, however, some of the segments will contain different characters, generally due to key-in errors by the operator. The verifying operator can recognize these deviant segments easily in the carpet display and marks them on the display for correction.

The present invention thus enables high accuracy to be achieved in manual key-in by improving the efficiency of quality verification. It obviates the need to key in all of the characters twice and thus saves substantially on the personnel costs of key-in. Preferred embodiments of the present invention may be used to facilitate manual key-in for applications in which OCR is unavailable or impractical, as well as for verifying fields that have been keyed-in manually due to OCR failure.

There is therefore provided, in accordance with a preferred embodiment of the present invention, a method for data key-in, including:

receiving images of documents containing characters;

receiving character codes entered by one or more key-in operators, the codes corresponding respectively to the characters in the documents;

identifying, for at least some of the character codes, respective areas of the images that contain the corresponding characters, such that each of the areas contains one of the characters; and displaying together a group of the areas of the images responsive to the corresponding character codes, so as to facilitate verification of the codes by a verifying operator.

In a preferred embodiment, the documents include form documents having fields that are filled in with the characters, and receiving the images includes receiving an image of one of the fields containing one or more of the characters at a known location on one of the form documents, and identifying the respective areas includes finding the areas containing the characters in the field at the known location.

Preferably, receiving the character codes includes receiving an operator-generated string of the codes corresponding to a group of the characters in one of the documents, and identifying the respective areas includes finding the group of characters responsive to the string. Most preferably, finding the group of characters includes applying optical character recognition to the characters in the group so as to produce a machine-generated string of character codes, and matching the operator-generated string to the machine-generated string.

In a further preferred embodiment, the documents include form documents having fields that are filled in with the characters, and receiving the images includes receiving an image of one of the fields containing a group of the characters, and identifying the respective areas includes segmenting the image of the field responsive to the keyed-in character codes corresponding to the characters in the field. Preferably, receiving the character codes includes receiving a sequence of codes corresponding respectively to the characters in the group, and segmenting the image includes dividing the image of the field into a number of segments equal to the number of codes in the sequence. Alternatively or additionally, segmenting the image includes dividing the image of the field into the areas such that the character in each of the areas has an appearance that accords with the corresponding one of the character codes.

Preferably, displaying the group of the areas includes selecting the group for display such that all of the areas in the group are identified with a selected one of the character codes. Further preferably, the method includes receiving an input from the verifying operator indicating that the character in one of the displayed areas does not accord with the selected character code and correcting the character code corresponding to the indicated character.

There is also provided, in accordance with a preferred embodiment of the present invention, a method for data key-in, including:

receiving images of documents containing characters;

receiving character codes entered by one or more key-in operators, the codes corresponding respectively to the characters in the documents;

identifying, for a selected sequence of the character codes, respective areas of the images that contain a corresponding sequence of the characters, such that each of the areas contains an instance of the corresponding sequence; and displaying together a group of the areas of the images that contain the corresponding sequence of the characters, so as to facilitate verification of the sequence of the character codes by a verifying operator.

There is additionally provided, in accordance with a preferred embodiment of the present invention, apparatus for data key-in, including:

a verification processor, arranged to receive images of documents containing characters and to receive character codes entered by one or more key-in operators, the codes corresponding respectively to the characters in the documents, and further arranged to identify, for at least some of the character codes, respective areas of the images that contain the corresponding characters, such that each of the areas contains one of the characters; and a display, coupled to the server so as to present together a group of the areas of the images responsive to the corresponding character codes, in order to facilitate verification of the codes by a verifying operator.

There is further provided, in accordance with a preferred embodiment of the present invention, a computer software product, including a computer-readable medium in which program instructions are stored, which instructions, when read by a computer, cause the computer to receive images of documents containing characters and to receive character codes entered by one or more key-in operators, the codes corresponding respectively to the characters in the documents, to identify, for at least some of the character codes, respective areas of the images that contain the corresponding characters, such that each of the areas contains one of the characters, and to display together a group of the areas of the images responsive to the corresponding character codes, so as to facilitate verification of the codes by a verifying operator.

The present invention will be more fully understood from the following detailed description of the preferred embodiments thereof, taken together with the drawings in which:

BRIEF DESCRIPTION OF THE DRAWINGS

FIG. 2 is a flow chart that schematically illustrates a method for data key-in and verification, in accordance with a preferred embodiment of the present invention.

DETAILED DESCRIPTION OF PREFERRED EMBODIMENTS

Figure 1:
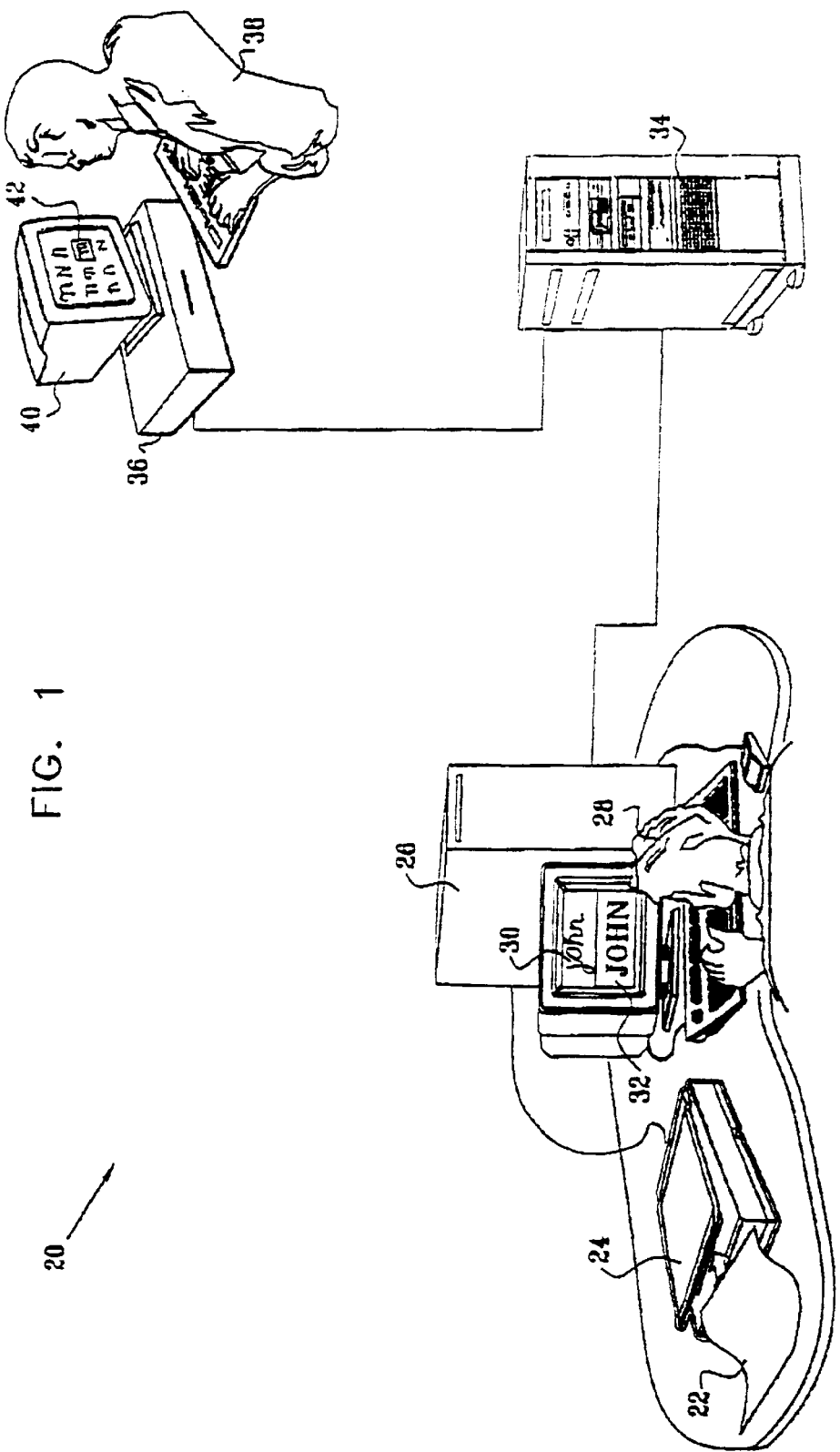
FIG. 1 is a schematic, pictorial illustration of a system for data key-in and verification, in accordance with a preferred embodiment of the present invention.

Reference is now made to FIGS. 1 and 2, which schematically illustrate a system 20 and a method for data key-in and verification, in accordance with a preferred embodiment of the present invention. FIG. 1 is a schematic pictorial depiction of system 20, while FIG. 2 is a flow chart illustrating the method implemented in the system.

At an image input step 50, an image of a form document 22 is generated by a scanner 24 or by another image input device known in the art. The scanned image is processed and is then displayed on a key-in terminal 26, for keying-in of the contents of the form by a key-in operator 28. Typically, the form contains multiple, predetermined fields at known locations on the document, which are filled in with handwritten or printed characters. Preferably, each field, such as a "name" field 30, is displayed in turn on terminal 26. Operator 28 types in the corresponding characters 32, typically using a keyboard, at a key-in step 52. Alternatively, an image of the entire form is displayed. The key-in results have the form of a sequence of codes (such as ASCII codes) corresponding to each field. Although for the sake of simplicity only a single key-in terminal is shown in FIG. 1, system 20 typically comprises multiple terminals, each with its own operator.

An image of document 22 and/or an image of field 30 and images of other fields that have been processed by operator 28 are passed to a key-in verification server 34, along with the corresponding sequences of keyed-in codes. For the purpose of verifying the codes, server 34 uses the codes to find the locations of the characters within the image, at a character location step 54. If the field has not already been located and isolated within the overall image of document 22, server 34 must first determine the location of the field in the image. This step is preferably accomplished by registering the image with a known form template to which it corresponds, and then taking the coordinates of the field from the template. A variety of suitable methods for template registration are known in the art, such as those described in U.S. Pat. Nos. 5,182,656, 5,204,756 and 5,793,887, whose disclosures are incorporated herein by reference.

Once the field has been located, it is necessary to find the positions of the characters within the image of the field.

Frequently, fields on document 22 are filled in not just with a single word, but with multiple words or strings. In this case, the codes keyed-in by operator 28 will also be grouped in words or strings with spaces in between. Preferably, server 34 identifies each of the strings or groups of characters in the image of field 30 with one of the words or strings of characters coded by operator 28. Substantially any suitable method of image analysis known in the art may be applied to the image of field 30 for this purpose. Alternatively or additionally, server 34 may apply optical character recognition (OCR) to the image of field 30, so as to produce machine-generated codes for the characters in the field. While these codes may contain errors, it is likely that they have sufficient resemblance to the operator-generated codes for the same field so that an optimal match between the machine-generated and operator-generated codes can be found. By matching the groups of characters in the field image to the corresponding operator-generated codes (by whichever method or combination of methods is used), server 34 identifies the character groups with the words or strings in the coded data, and thus determines the approximate locations of the characters within the groups.

At a segmentation step 56, server 34 divides the image of field 30 into areas, or segments, each containing a single character. This segmentation is facilitated by the identification of the words in the field at step 54, indicating into how many segments the field and the words in the field should be divided. Thus, in the simple example shown in FIG. 1, server 34 knows that it must divide field 30 into four segments, despite the letters in the field being joined to one another in cursive script. Separating letters or numbers that are joined together or overlap is one of the most difficult tasks in OCR, and frequently causes two separate characters to be read as a single character or causes a single character to be read as two distinct characters. In preferred embodiments of the present invention, however, the number of characters into which a word must be segmented is known in advance, based on the input received from operator 28, so that the likelihood of segmentation errors is substantially reduced. The expected sizes and shapes of the individual characters, based on the corresponding codes, can also be used in carrying out the segmentation.

Server 34 sorts the image segments into groups, according to the associated character codes keyed-in by operator 28, at a sorting step 58. When the server has accumulated a large enough group of segments associated with a given character, it generates a "carpet" display of the segments, at a display step 60. The carpet is typically displayed on a monitor screen 40 of a verification terminal 36. Although for simplicity only a single verification terminal 36 is shown in FIG. 1, in a large processing system there will typically be multiple verification terminals. As in the IFP system described in the Background of the Invention, the carpet displayed on screen 40 preferably presents a verification operator 38 with a matrix of image segments, all of which are supposed to contain the same character, generally taken from different fields and different documents that have been input to system 20.

Alternatively, other modes of display may be used, in which segments taken from different fields and, typically, different documents are interspersed to facilitate verification and error detection. For example, a carpet may be made up of segments that are supposed to contain the same word. This mode of display is useful particularly when it is difficult to separate the individual characters, such as in text that is written in cursive script.

In the example shown in FIG. 1, the characters in all of the segments shown on screen 40 were coded by key-in operator 28 as "N", but one segment 42, which was coded erroneously, contains an "M". Operator 38 marks this erroneous segment, typically using a pointing device, such as a mouse (not shown), connected to terminal 36. For each character in the matrix on screen 40, system 20 maintains a record of the document, field and location from which the corresponding segment was taken. Server 34 is thus able to recall the field or entire document from which segment 42 was taken, and prompts one of the operators, typically verification operator 38, to correct the erroneous coding so the character in the segment. It will be appreciated that this method of computer-assisted error detection and correction takes far less time than would be required to verify the key-in results by manually coding all of the documents a second time, as in systems known in the art.

Preferably, server 34 and terminals 26 and 36 comprise standard, general-purpose computer processors and other equipment, connected by a network, as is known in the art. Most preferably, the processors carries out the functions described hereinabove under the control of suitable software. The software may be supplied to the server and terminals on tangible media, such as CD-ROM, or it may be downloaded in electronic form over the network or other electronic link. Alternatively, system 20 may comprise dedicated, hard-wired elements or a digital signal processor for carrying out some or all of functions described herein.

Although preferred embodiments are described hereinabove with reference to keying of data filled into form documents, the present invention can be used in substantially any application that involves manual key-in of text, numbers and/or other characters. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for data key-in, comprising:

receiving images of documents containing characters;

receiving character codes entered by one or more key-in operators, the codes corresponding respectively to the characters in the documents;

identifying, for at least some of the character codes, respective areas of the images that contain the corresponding characters, such that each of the areas contains one of the characters; and displaying together a group of the areas of the images responsive to the corresponding character codes, so as to facilitate verification of the codes by a verifying operator, wherein the documents comprise form documents having fields that are filled in with the characters, and wherein receiving the images comprises receiving an image of one of the fields containing a group of the characters, and wherein identifying the respective areas comprises segmenting the image of the field responsive to the keyed-in character codes corresponding to the characters in the field.

2. A method according to claim 1, wherein receiving the character codes comprises receiving a sequence of codes corresponding respectively to the characters in the group, and wherein segmenting the image comprises dividing the image of the field into a number of segments equal to the number of codes in the sequence.

3. A method according to claim 1, wherein segmenting the image comprises dividing the image of the field into the areas such that the character in each of the areas has an appearance that accords with the corresponding one of the character codes.

4. A method for data key-in, comprising:
receiving images of documents containing characters;
receiving character codes entered by one or more key-in operators, the codes corresponding respectively to the characters in the documents;
identifying, for at least some of the character codes, respective areas of the images that contain the corresponding characters, such that each of the areas contains one of the characters; and displaying together a group of the areas of the images responsive to the corresponding character codes, so as to facilitate verification of the codes by a verifying operator,
wherein displaying the group of the areas comprises selecting the group for display such that all of the areas in the group are identified with a selected one of the character codes.

5. A method according to claim 4, wherein the documents comprise form documents having fields that are filled in with the characters, and wherein receiving the images comprises receiving an image of one of the fields containing one or more of the characters at a known location on one of the form documents, and wherein identifying the respective areas comprises finding the areas containing the characters in the field at the known location.

6. A method according to claim 4, wherein receiving the character codes comprises receiving an operator-generated string of the codes corresponding to a group of the characters in one of the documents, and wherein identifying the respective areas comprises finding the group of characters responsive to the string.

7. A method according to claim 6, wherein finding the group of characters comprises applying optical character recognition to the characters in the group so as to produce a machine-generated string of character codes, and matching the operator-generated string to the machine-generated string.

8. A method according to claim 4, and comprising receiving an input from the verifying operator indicating that the character in one of the displayed areas does not accord with the selected character code.

9. A method according to claim 8, and comprising correcting the character code corresponding to the indicated character.

10. Apparatus for data key-in, comprising:
a verification processor, arranged to receive images of documents containing characters and to receive character codes entered by one or more key-in operators, the codes corresponding respectively to the characters in the documents, and further arranged to identify, for at least some of the character codes, respective areas of the images that contain the corresponding characters, such that each of the areas contains one of the characters; and
a display, coupled to the verification processor so as to present together a group of the areas of the images responsive to the corresponding character codes, in order to facilitate verification of the codes by a verifying operator,
wherein the documents comprise form documents having fields that are filled in with the characters, and wherein the images comprise an image of one of the fields containing a group of the characters, and wherein the processor is arranged to segment the image of the field responsive to the keyed-in character codes corresponding to the characters in the field.

11. Apparatus according to claim 10, wherein the character codes comprise a sequence of codes corresponding respectively to the characters in the group, and wherein the processor is arranged to segment the image by dividing the image of the field into a number of segments equal to the number of codes in the sequence.

12. Apparatus according to claim 10, wherein the processor is arranged to segment the image by dividing the image of the field into the areas such that the character in each of the areas has an appearance that accords with the corresponding one of the character codes.

13. Apparatus for data key-in, comprising:
a verification processor, arranged to receive images of documents containing characters and to receive character codes entered by one or more key-in operators, the codes corresponding respectively to the characters in the documents, and further arranged to identify, for at least some of the character codes, respective areas of the images that contain the corresponding characters, such that each of the areas contains one of the characters; and
a display, coupled to the verification processor so as to present together a group of the areas of the images responsive to the corresponding character codes, in order to facilitate verification of the codes by a verifying operator,
wherein the processor is arranged to select the group of areas for display such that all of the areas in the group are identified with a selected one of the character codes.

14. Apparatus according to claim 13, wherein the documents comprise form documents having fields that are filled in with the characters, and wherein the images comprise an image of one of the fields containing one or more of the characters at a known location on one of the form documents, and wherein the processor is arranged to identify the areas by finding the areas containing the characters in the field at the known location.

15. Apparatus according to claim 13, wherein the character codes comprise an operator-generated string of the codes corresponding to a group of the characters in one of the documents, and wherein the processor is arranged to identify the areas by finding the group of characters responsive to the string.

16. Apparatus according to claim 15, wherein the processor is arranged to find the group of characters responsive to the string by applying optical character recognition to the characters in the group so as to produce a machine-generated string of character codes, and to match the operator-generated string to the machine-generated string.

17. Apparatus according to claim 13, wherein the processor is arranged to receive an input from the verifying operator indicating that the character in one of the displayed areas does not accord with the selected character code.

18. Apparatus according to claim 17, wherein the processor is arranged to correct the character code corresponding to the indicated character.

19. A computer software product, comprising a computer-readable medium in which program instructions are stored, which instructions, when read by a computer, cause the computer to receive images of documents containing characters and to receive character codes entered by one or more key-in operators, the codes corresponding respectively to the characters in the documents, to identify, for at least some of the character codes, respective areas of the images that contain the corresponding characters, such that each of the areas contains one of the characters, and to display together a group of the areas of the images responsive to the corresponding character codes, so as to facilitate verification of the codes by a verifying operator, wherein the documents comprise form documents having fields that are filled in with the characters, and wherein the images comprise an image of one of the fields containing a group of the characters, and wherein the instructions cause the computer to segment the image of the field responsive to the keyed-in character codes corresponding to the characters in the field.

20. A computer software product, comprising a computer-readable medium in which program instructions are stored, which instructions, when read by a computer, cause the computer to receive images of documents containing characters and to receive character codes entered by one or more key-in operators, the codes corresponding respectively to the characters in the documents, to identify, for at least some of the character codes, respective areas of the images that contain the corresponding characters, such that each of the areas contains one of the characters, and to display together a group of the areas of the images responsive to the corresponding character codes, so as to facilitate verification of the codes by a verifying operator, wherein the instructions cause the computer to select the group of areas for display such that all of the areas in the group are identified with a selected one of the character codes.

\* \* \* \* \*